US005913810A

United States Patent [19]

Andre

[11] Patent Number: 5,913,810

[45] Date of Patent: Jun. 22, 1999

[54] POSITION MAINTENANCE DEVICE FOR THE SHAFT OF A HYDRAULIC CYLINDER

[75] Inventor: Jean-Luc Andre, Obernai, France

[73] Assignee: Lohr Industrie, Hangenbieten, France

[21] Appl. No.: 08/966,186

[22] Filed: Nov. 7, 1997

[30] Foreign Application Priority Data

Nov. 7, 1996 [FR] France .................................. 96 13778

[51] Int. Cl.[6] ...................................................... F16D 31/02

[52] U.S. Cl. ................................ 60/420; 60/426; 60/462

[58] Field of Search ............................. 91/418, 420, 426, 91/422, 462

[56] References Cited

U.S. PATENT DOCUMENTS

| | | | |
|---|---|---|---|
| 2,702,044 | 2/1955 | Johnston . | |
| 2,797,550 | 7/1957 | Stelzer | 91/426 X |
| 3,381,587 | 5/1968 | Parquet | 91/426 X |
| 4,355,565 | 10/1982 | Bianchetta . | |
| 4,913,190 | 4/1990 | Kugler | 91/426 X |
| 5,261,456 | 11/1993 | Patton et al. | 91/426 X |

FOREIGN PATENT DOCUMENTS

| | | | |
|---|---|---|---|
| 0 736 443 | 10/1996 | European Pat. Off. . | |
| 2216468 | 8/1974 | France . | |
| 20 36 547 | 1/1972 | Germany . | |
| 2205385 | 12/1988 | United Kingdom | 91/426 |

*Primary Examiner*—Hoang Nguyen
*Attorney, Agent, or Firm*—Davis and Bujold

[57] ABSTRACT

The maintenance device consists of a hydraulic insulation unit (2) mounted between the supply circuits of a cylinder (1). The insulation unit (2) comprises a sluice (9) which has, at each of its two openings, an anti-return valve, one of which, the primary valve (11) is hydraulically connected to the outlet chamber (6) of the shaft (7) of the cylinder (1) and opens toward said chamber; and a safety valve (13) opening in the same direction, with the latter valve closing at a different rate than the primary valve closes. The invention is useful for maintaining the shaft of any cylinder in position, particularly a charged cylinder, and it is of interest to manufacturers of hydraulic devices, particularly lifting cylinders, as well as those who use them.

21 Claims, 5 Drawing Sheets

POSITION MAINTENANCE DEVICE FOR THE SHAFT OF A HYDRAULIC CYLINDER

REALM OF THE INVENTION

The present invention concerns a device for maintaining the shaft of a hydraulic cylinder in position. It is also used to detect leaks in the return circuit of the motor chamber.

TECHNOLOGICAL BACKGROUND OF THE INVENTION

Hydraulic shafts are frequently used to propel the raising and lowering elements of a supporting structure. These devices are well known and are used in the transportation field, as well as in construction and other areas requiring frequent raising and lowering of loads that are too heavy for people to lift.

The conventional way of maintaining the charge on a shaft is to use an anti-return valve inserted in the valve supply circuit opening in the direction of the shaft outlet chamber. Maintaining the charge in this way ensures that the device operates properly so long as the valve remains sealed. This is a quality control feature incorporated during the manufacturing process. However, the valve may either gradually or suddenly fail to seal after a certain period of time for various reasons connected to its operation, or due to aging or even a minor undetected structural defect. One possible cause could be a structural defect such as a ball bearing that is not perfectly spherical, or a solid impurity from the oil circuit lodging in the valve, or some other source of faulty mechanical contact or irregular thickening between the valve body and its socket.

Such defects cause leaks which, even if insignificant, slowly weaken the charge after a period of hours, posing a danger to both the material and to the people working beneath the mechanism.

Thus, it is imperative to maintain this charge in all applications where holding the shaft securely in the supporting position is an important and primary safety concern.

In the case of hydraulic shafts, the only way to guaranty that an anti-return valve maintains its charge on the shaft is to be certain the valve is sealed.

To prevent failure in a function as important as cylinder maintenance, the valve must be completely sealed.

Presently, there is no such guaranty, and for this reason, when safety requires it, lifting cylinders are associated with blocking-locking mechanical devices, for example, locking pins or safety stops.

The goal of such blocking-locking devices or stops is to ensure that the charged support structures remain in position if there is a prolonged mechanical malfunction. Although maintaining the structures securely in position is a safety measure for the benefit of both the merchandise and the people operating the shaft and the control circuit, it has not be possible to ensure complete safety because there is always a possibility of leaks in the anti-return valve.

OBJECTS OF THE INVENTION

The goal of the invention is to eliminate the need for the supplemental mechanical retention devices which have been necessary in the past to safely maintain a charged hydraulic cylinder locked in position.

SUMMARY OF THE INVENTION

To achieve this, the invention proposes a device which maintains the shaft of a hydraulic cylinder, at least a single-effect cylinder, in position, comprising a chamber, which may be at the shaft outlet, and at least one anti-return valve mounted in the chamber supply circuit, opening toward the chamber, wherein the maintenance device consists of a hydraulic insulation block through which the chamber is supplied, characterized in that:

- the anti-return valve, called the primary valve, is completed by an anti-return safety valve separated from the primary valve and mounted upstream in the chamber supply circuit, opening in the same direction toward the chamber;
- a sluice with an anti-return valve at each of its two inlets-outlets, consisting of first the primary valve, which is the valve closest to said chamber, and second, the safety valve;
- a means for closing the safety valve which is different from the means for closing the primary valve;
- a means to control opening both valves.

This invention has multiple applications in the many situations where a load must be raised or lowered and the cylinder shaft must be maintained in a holding position, or more specifically, the extended position.

One example would be lifting the cargo to load a vehicle transport trailer, raising and holding the platforms or supporting plates on such trailers, or the like.

The device of the invention offers many advantages:

- the shaft of the cylinder can be locked in any position;
- it is locked automatically;
- the hydraulic device of the invention locks automatically without being costly; and
- the hydraulic device maintains the load very safely.

BRIEF DESCRIPTION OF THE DRAWINGS

Other features and advantages of the invention will be apparent from the following description, given by way of example, and the accompanying drawings, in which.

DETAILED DESCRIPTION OF THE EMBODIMENTS ILLUSTRATED

Figure 1:
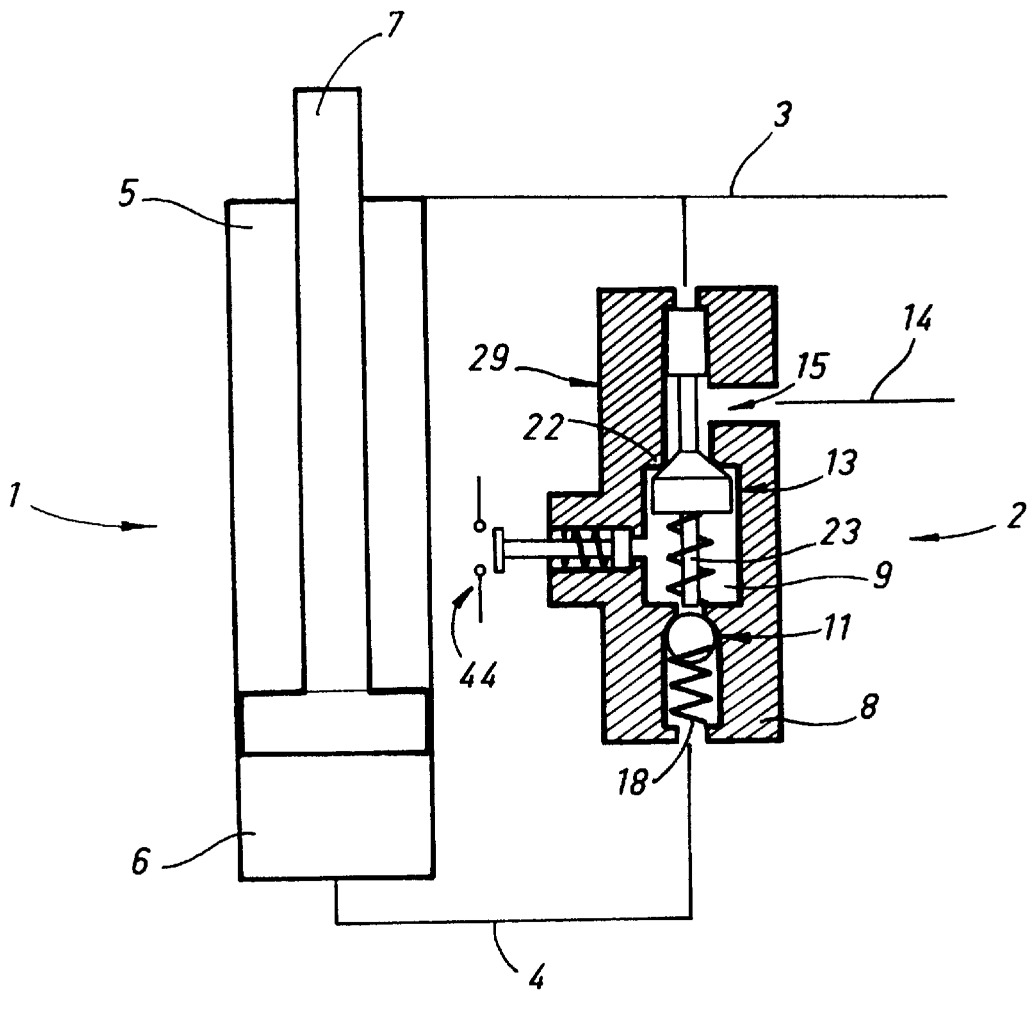
FIG. 1 is a general schematic view in cross-section showing the maintenance device according to the invention mounted on the branches of a cylinder supply circuit.

The device for maintaining the position of the shaft of a hydraulic cylinder 1 is shown in the form of an insulation unit 2 mounted between one branch 3 and another branch 4 supplying power fluid through an inlet chamber 5 and an outlet chamber 6 on the shaft 7 of a hydraulic cylinder 1.

This insulation unit 2 forms a hydraulic block 8 sealing a sluice-chamber 9, which, for the sake of convenience, will be referred to simply as a sluice. Said sluice has a lower opening 10 with a primary anti-return valve 11 hydraulically connected with the outlet chamber 6 of cylinder shaft 7 and opposite it, an upper opening 12 with an anti-return safety valve 13 communicating hydraulically with a hydraulic inlet 14 extending into a transverse channel 15 supplying power fluid from the outlet chamber 6 through the hydraulic inlet 14.

The primary anti-return valves 11 and the safety valve 13 are physically distinct and moves from the top to the bottom, as in the drawings, that is, in the direction of flow from outlet chamber 6 of shaft 7 through hydraulic inlet 14.

Advantageously, primary valve 11 takes the form of a ball bearing anti-return valve 16 forced to close against the seating adapted to fit it, for example, conical element 17, traversed through the center by lower opening 10. The return force comes from a return spring 18 enclosed in housing 19 near the lower extremity of insulation unit 2.

The anti-return safety valve 13 in the first variation is made of a truncated piece with an active conical surface which, in closed position, contacts a circular rim 21 of an annular abutment 22 perforated through the center by upper opening 12.

Safety valve 13 opens conventionally and automatically due to incidental pressure.

Safety valve 13 is opened by some means outside insulation unit 2, for example, the force of the pressurized hydraulic fluid supplying the return chamber of the shaft, or some other means. It also opens primary valve 11 in succession.

To do this, safety valve 13 extends downward into a lower control shaft 23 which has a return spring 24 on its lateral surface, in closed position. Said control shaft 23 terminates in a free extremity with an upright contact surface which passes through lower opening 10 of sluice 9 to abut the body of primary valve 11 and open it, that is, pushing it out of its seating 17 when it encounters the elastic return force from spring 18.

Since there are two separate pieces, play 25 exists between the extremity of shaft 23 and bearing 16 of primary valve 11, and therefore the two valves move independently.

Safety valve 13 is integral with a means which slows its closure in order to differentiate between closing this valve and closing primary valve 11. This eliminates considerable dynamic pressure, and consequently any flow into sluice 9 during the phase of closing safety valve 13.

Figure 4:
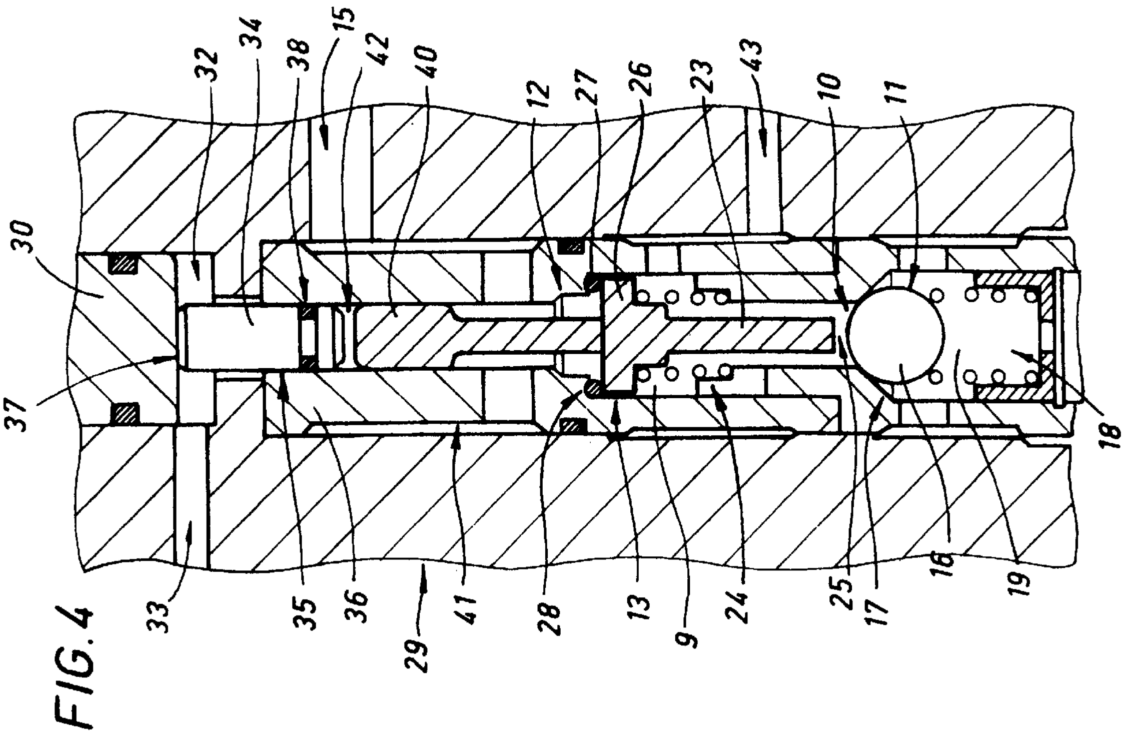
FIGS. 3 and 4 are, respectively, enlarged longitudinal cross-sections of the central portion of the maintenance device in each of two embodiments: one with a conical valve, and the other with a totally sealing valve, with the valves shown closed.

This feature is important because it permits one connection to be used for perfecting the seal and thus increases efficiency of the safety valve. This type of valve and connection is called a total seal valve 26. It is the ideal way to seal sluice 9 and reinforce maintenance of the position of the charged cylinder shaft. This variation is shown in FIG. 4 in the form of total seal valve 26 with connection 27, which may be a toric connection, resting on its groove-like seating 28.

These total seal valves offer little resistance to dynamic pressure, as there is a risk that the pressure can cause extrusion of the joint.

Figure 3:
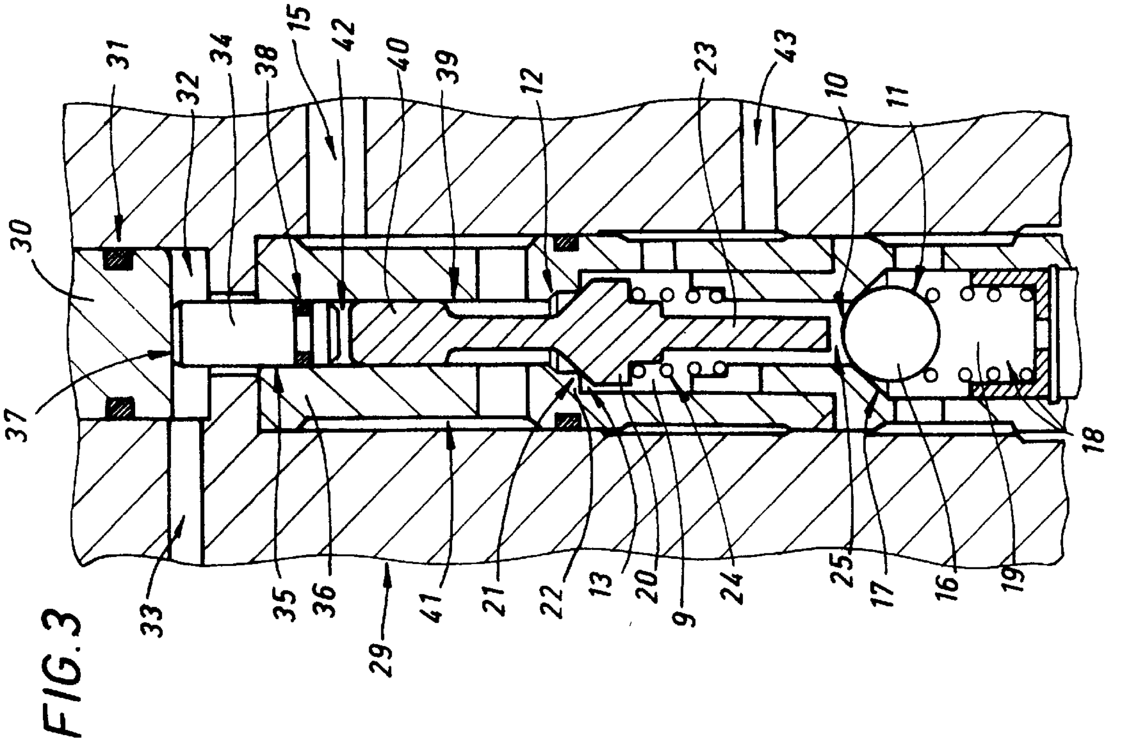

Another example of an embodiment of a total seal valve would be to either partially or totally surround the conical surface of the body of safety valve 13 shown in FIG. 3 with a coating or a sealing material pressing upon shoulder 22, preferably beveled for this purpose.

One of the merits of the invention is that it offers the possibility of using a total seal valve, such as valve 26, for the second valve, called the safety valve, since there is no dynamic pressure against the seating when the valve is closed.

The means for slowing the return course of safety valve 13, in the example shown, is an upper, composite mechanical connector 29 consisting of a movable, guided device. This upper composite mechanical connector 29 consists of three freely moving portions which are guided and move in relation to one another. There is an upper portion formed of a piston-button 30 sealed by a joint 31, which piston-button is displaced along chamber 32 exposed to the atmosphere through a vent 33 opening onto one surface of insulation unit 2. There is also a counterweight 34 sliding freely within a guide-groove 35 formed in supplemental piece 36. The upper extremity 37 of this counterweight contacts the lower surface of piston-button 30.

Counterweight 34 on composite mechanical connection 29 comprises a seal 38 near its lower extremity, sealing this segment from chamber 32, within which piston-button 30 is displaced.

The upper movable device consists of a final segment 39 in the form of a shaft integral with the valve body. Said shaft 39 has one upper cylindrical extremity toward the top, forming an end piston 40 sliding with some play along guide-groove 35 formed in supplemental piece 36.

Said supplemental piece 36 laterally defines, along with insulation unit 2, an annular chamber 41 for passage of the oil which acts upon the body of safety valve 13.

The extremities opposite counterweight 34 and end piston 40 are separated by a space which forms, with the lateral wall of the guide groove, a reservoir-chamber 42 filled with oil used to absorb shocks.

Piston-button 30 actuates safety valve 13 to open using a force to displace it downward originating from a control means, for example, the force originating from the pressure of the power fluid in return chamber 5 of cylinder shaft 7 exerted on the upper surface of piston-button 30 placed in the supply conduit of said return chamber.

The force which opens safety valve 13 may originate from another means or another energy source.

The shock absorbing effect results from oil in reservoir-chamber 42 acting as a buffer, which will be progressively expelled from this reservoir-chamber 42 as safety valve 13 returns to the closed position. The oil will actually be driven out of this chamber as it is forced along end piston 40 by the play between the piston and its guide-groove 35.

The shaft of the safety valve is in viscous contact with oil and provides additional shock absorption. This feature works together with the shock absorption provided by variations in rigidity between the return springs on the valves or shape variations in the hydraulic components. One or both of these parameters may be used alone or in combination.

Sluice 9 communicates hydraulically through channel 43 with a pressure sensor or detector 44, for example a manometer inserted in the electrical or electronic circuit, producing a visual, auditory, or other type of signal if there are any leaks.

Figure 2:
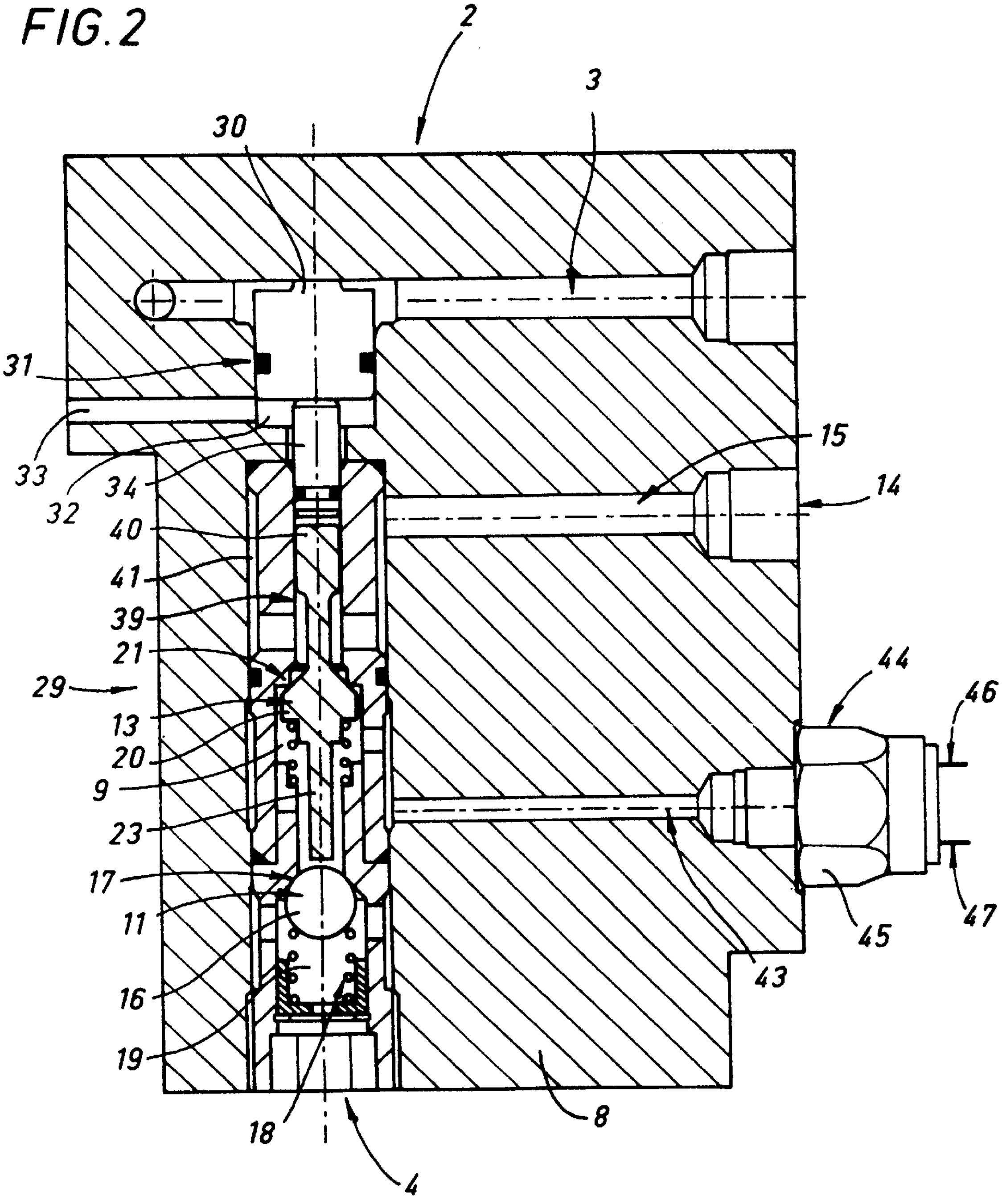
FIG. 2 is a longitudinal cross-section of a first embodiment of the maintenance device.

FIG. 2 shows mechanical block 45 of the manometer 44 and its two output pins 46 and 47 for electrical connection with the detection circuit.

With a single-effect hydraulic shaft, some independent means activates the safety valve, such as an electromechanical or electromagnetic means or the like.

In addition, the maintenance device of the invention is completely reversible insofar as the supply branches are concerned. Therefore, the outlet of insulation unit 2 may be connected to inlet chamber 5, or conversely, outlet chamber 6 may be connected directly to a pressure source.

The first operation described concerns cylinder 1 and the displacement of its shaft 7 for raising and lifting, and next, the operation of insulation unit 2 as it is used to maintain the charged position at the desired height.

Cylinder shaft 7 extends when calibrated pressure reaches the hydraulic inlet 14 of hydraulic block 8. This pressure control will automatically open both valves 13 and 11, one after the other, as they encounter the return force of each of the springs 24 and 18, and will then supply shaft outlet chamber 6. The pressure is cut off when cylinder shaft 7 extends to the length desired.

As soon as pressure is cut, the return force of springs 18 and 24, which up until this point has been stronger than the force of the controlling pressure, tends to push valves 11 and 14 back into closed position.

The cushioning effect on the safety valve then slows down the closing of the two valves, that is, it slows the closure of safety valve 13 and primary valve 11 at different rates. Relative pressure in the sluice then becomes essentially nil.

If there is a leak in primary valve 11, which occurs only if there is a mechanical cause at the moment the valve closes, static pressure prevailing in the sluice will rapidly exceed the calibrated threshold in the manometer 44 and will trigger the alarm.

This pressure increase will quickly attain an equilibrium and will neutralize the effects of the leak, since safety valve 13 will then seal only the leak.

To activate the cylinder shaft return operation, pressure is sent to return chamber 5. As pressure reaches piston-button 30, it pushes the button down, displacing the movable elements and opening in series, one after the other, valves 13 and 11, thereby releasing the fluid from outlet chamber 6 and sending it through sluice 9.

Figure 5:
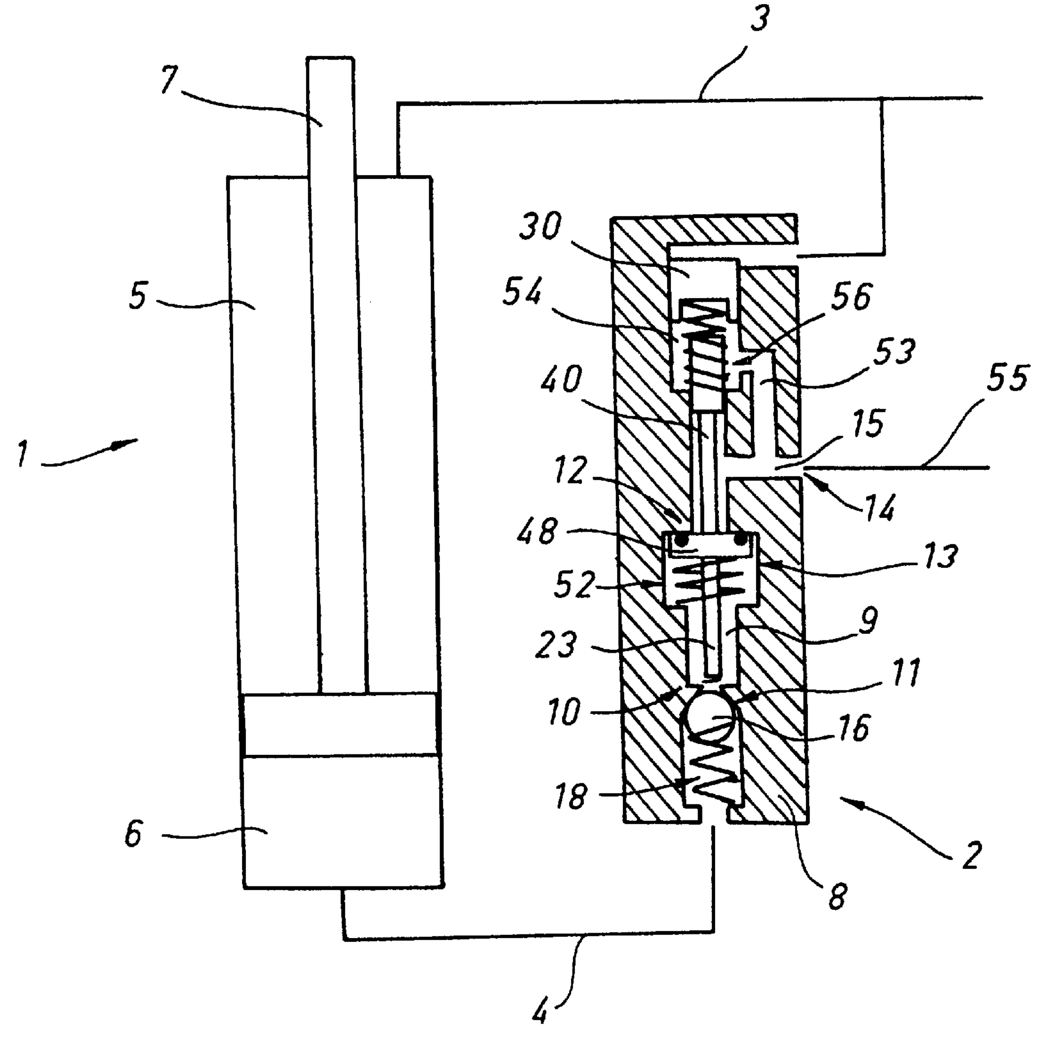
FIG. 5 is a general schematic cross-section showing the simplified variation of the maintenance device according to the invention attached to the supply branches of a shaft with valves, which are shown closed.
Figure 6:
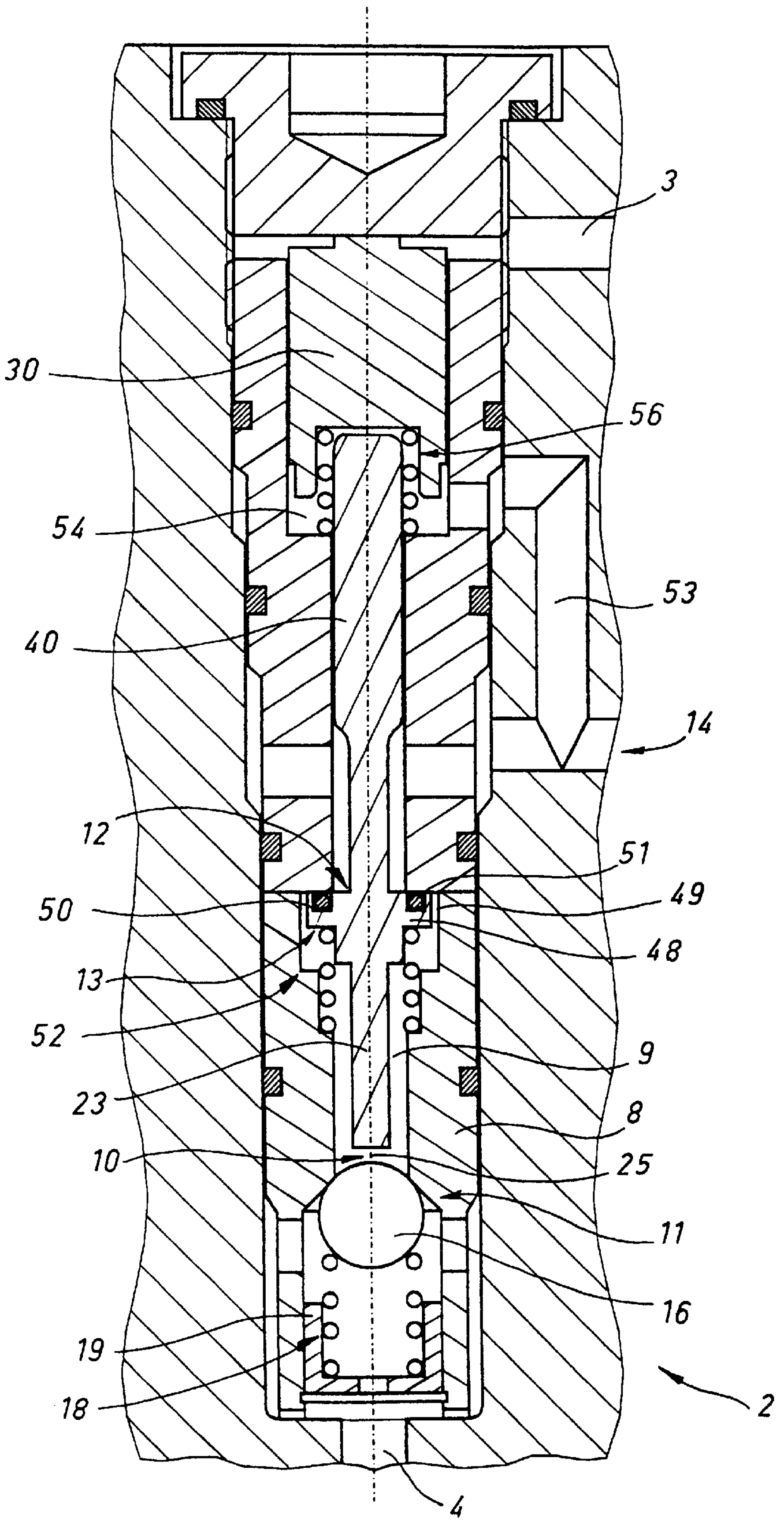
FIG. 6 is a longitudinal cross-section of the simplified variation of the maintenance device.

FIGS. 5 and 6 show a simplified variation of the position maintenance device of the invention, retaining the same general functions and using the same or equivalent operating means.

It is not essential to monitor pressure in sluice-chamber 9.

Additionally, the chamber situated below piston-button 30 does not communicate with the exterior, but with the flow of power fluid rising in shaft 7 of the hydraulic cylinder.

The main elements and the principal organs remain functionally identical and, in general, retain the same references.

For the sake of clarity, another brief description of the unit follows.

The position maintenance device according to the invention applies mainly, but not exclusively, to a hydraulic cylinder 1 supporting a load held by a support to be raised, lowered, and safely maintained in the desired position.

The position maintenance device consists of a hydraulic insulation unit 2 in the form of a hydraulic block 8 mounted between two branches 3 and 4 supplying power fluid to the inlet chamber 5 and the outlet chamber 6, respectively, of shaft 7 in the case of a dual-effect cylinder.

Hydraulic bock 8 encloses a sluice-chamber 9 comprising an lower opening 10 with a primary anti-return valve 11 connecting it to outlet chamber 6, and an upper opening 12 with an anti-return safety valve 13 communicating hydraulically with a hydraulic inlet 14 extending into transverse channel 15. Valves 11 and 13 move from top to bottom, as in the drawings.

In the embodiment shown, primary valve 11 has a ball bearing 16 elastically pushed into closed position against its seating by spring 18.

Safety valve 13, in the embodiment of this variation shown, has a flat, circular body 48 with a raised area of smaller diameter than its housing 49.

There is an annular groove 50 accommodating seal 51, which may be a toric seal. It is elastically forced to close against its seating by a coaxial return spring 52 at the origin of control shaft 23, the lower extremity of which can pass through lower opening 10 to exert mechanical force against ball bearing 16.

This safety valve 13 ensures that the charged position is maintained.

As indicated above, there is some play 25 between the lower extremity of shaft 23 and bearing 16, allowing a certain freedom of movement between the two valves and which, in controlled mode, slows the opening of primary valve 11 triggered by the opening of safety valve 13.

Valve 13 ensures that the device is safely maintained in position. However, the effectiveness of this safety valve depends upon the strength of its connection after many maneuvers.

This valve must be dependable enough to close even if there is only a very slight or hardly any flow of liquid.

These requirements are met so long as safety valve 13 consistently closes after primary valve 11 closes.

In the variations described above, this feature slows down the closing of safety valve 13 using a delay mechanism which fragments movable upper element into a counterweight 34, sliding freely in an axial direction, the upper end of which is in contact with the base of piston-button 30 displaceable along chamber 32, which is open to the atmosphere.

The lower extremity of counterweight 34 is opposite the extremity of a piston 40 connected to the body of the valve through a reservoir-chamber 42 full of oil used for shock absorption.

In the present variation shown in FIGS. 5 and 6, there is no counterweight 34 to serve as a movable mechanical intermediary between safety valve 13 and activating piston-button 30.

As in the preceding variations, the delay feature which closes the valves at different times can be obtained using different methods alone or in combination, for example: varying the rigidity of the return springs on the valves; the viscous contact of the shaft of valve 13 in sluice-chamber 9; and, generally speaking, using oil to slow the shaft, and the shape and dimension of the hydraulic components.

The modifications which have different references are as follows:

Transverse channel 15 of the hydraulic inlet 14 has a shunt 53 leading into a buffer-chamber 54 beneath piston-button 30. For this reason, buffer-chamber 54 no longer communicates with the exterior through a vent. It is connected to inlet 14 and filled with pressurized oil. As a result, the risk of corrosion due to exposure to the elements is completely eliminated.

When the shaft of end piston 40 begins to descend with fluid pressure from conduit 3, inlet 14 coming from supply line 55, and outlet chamber 6, through the device, connects to the reservoir at the same time as buffer-chamber 54. The controlled downward displacement of piston-button 30 caused by the pressure of the fluid coming from conduit 3 opens safety valve 13 and then, consecutively, for example, after mechanical contact with shaft 23, it opens primary valve 11.

Return spring 56 pushes piston-button 30 back up.

Another advantage of this variation concerns sealing. Sealing is less important, since leaks flow into the line of the hydraulic circuit. Consequently, it is possible to eliminate the seal between buffer-chamber 54 and the inlet of conduit 3 in the upper portion of piston-button 30, on the one hand, as well as the seal between the and piston 40 of safety valve 13 and buffer-chamber 54, on the other hand.

This feature makes the device even more reliable.

The following description concerns the operation of the maintenance device according to the invention using a charged cylinder as an example. Its operation when not charged will be easily inferred by transposing the steps in operation described.

Raising the Charged Shaft

Pressurized fluid penetrates hydraulic block 8 through branches 15 and 53 approaching safety valve 13 and buffer-chamber 54.

This pressure is sufficient to open first, safety valve 13, and then primary anti-return valve 11, supplying the shaft through outlet chamber 6 on shaft 7.

Shaft 7 rises with the load it supports to the desired level, which may or may not have been pre-programmed. Pressure is then cut off and the shaft is immobilized in position. Immediately after it is immobilized, the charge causes the oil to flow back for a short time.

The rapid return of the oil pushes the bearing of primary valve 11 back into its seating due to the elastic return force.

If there is no charge, primary valve 11 closes due solely to the effects of the return spring.

Safety valve 13 closes a second time within sluice-chamber 9, as there is no pressure because primary valve 11 has previously closed and insulated it from pressure. The closure of the valve in the absence of dynamic pressure and liquid flow controls the safety valve seal and prevents the valve from leaving its housing.

To ensure this ordered succession of valve closings, various means already described above are used, such as: variations in the rigidity of the valve return springs; viscous contact of the shaft of valve 13 in sluice-chamber 9; and generally speaking, slowing down the course of the shaft in the oil, as well as the shape and dimension of the hydraulic components.

In the majority of cases, when the charged shaft is raised, the fluid flow and the return force are sufficient for bearing 16 to close primary valve 11 before safety valve 13 closes.

Maintenance in Charged Position

Two anti-return valves ensure that the device is maintained in charged position. Primary valve 11 with bearing 16 closes to immediately maintain the charge.

During normal operation, pressure within sluice-chamber 9 is low.

If there is a flaw or a leak in primary valve 11, it is so small that it will not maintain its seal adequately over the course of time. Such a leak would involuntarily cause a slow reduction in charge, posing a danger to the cargo below the platform which the cylinder supports.

Safety valve 13 ensures position maintenance.

Since it is made with a seal 51 which is not subjected to enough force during closure to affect its hold, the safety valve provides a highly reliable seal.

The load will remain in position almost indefinitely.

Descent of the Charged Shaft

Controlling the descent of shaft 7 of the charged cylinder requires that both valves be opened. The source of the force opening them is controlling pressure. This may consist of the pressure exerted on the other chamber of the dual-effect cylinder, or pressure independent of the control means.

Pressure is first exerted on piston-button 30, which is displaced and causes displacement of the valve body when piston-button 30 contacts the end of the upper extension 40 of the shaft of safety valve 13, and by mechanical translation.

The shaft of the safety valve continues to descend. The lower extremity of its shaft 23 abuts and pushes upon the stopper of the primary valve, and as it follows it course, causes it to open.

Thus, the pressurized fluid is free to flow toward conduit 15 and inlet 14 which is connected to the reservoir. Fluid is thus evacuated from chamber 6 into the reservoir through sluice-chamber 9 and conduit 15.

Since the safety valve is in the open position, there is no risk of wear on the seal and no possibility that it will slip out of its housing.

Stopping the Descent of the Charged Shaft

If the supply of pressurized power fluid 3 is cut, the valves are no longer kept open and, in the same manner as described above, safety valve 13 is closed more slowly than primary valve 11. The movable element unit and piston-button 30 move upward.

It is important to understand that one object of this invention is for the safety valve to close if there is even a slight flow of oil, in order to avoid damaging or dislodging the valve seal and to ensure that the device operates reliably.

As the cylinder shaft returns to position, it will also open the valves, providing another means of opening the valves that is independent of the controlling pressure on the shaft forcing it back.

The shaft can also be driven back by the force of gravity coming from the loaded platform.

It should be specifically noted here that the improved, simplified methods used in this last embodiment are also applicable to the preceding variations, and that any technical form of valve can be used.

Obviously, using the same system, the device of the invention can be oriented to move in the opposite direction from that shown in the drawings, or any other orientation.

What is claimed is:

1. A device for maintaining a position of a cylinder shaft of a hydraulic cylinder, said device comprising a hydraulic cylinder being divided by a shaft into a power chamber and a return chamber; at least one spring biased primary anti-return valve being provided in a hydraulic supply circuit to one of the chambers, said primary anti-return valve opening, against the spring bias, in a hydraulic flow direction toward said one of the chambers, and said device comprising a hydraulic insulation block through which said one of the chambers is supplied with hydraulic fluid;

wherein the device further includes a spring biased anti-return safety valve which is separated from the primary anti-return valve by a sluice-chamber formed within the hydraulic insulation block, each of the primary anti-return valve and the safety valve has two opposed openings which facilitate supplying said one of the chambers with hydraulic fluid, and both the primary anti-return valve and the safety valve open in a direction in which power fluid flows toward said one of the chambers;

delay means for delaying the closing safety valve until after the primary anti-return valve is closed; and means for opening of both the safety valve and the primary anti-return valve.

2. The device for maintaining the position of the shaft of the hydraulic cylinder according to claim 1, wherein the delay means for delaying the closing safety valve until after the primary anti-return valve is closed is a delay mechanism which slows a return course of the safety valve to a closed seated position.

3. The device for maintaining the position of the shaft of the hydraulic cylinder according to claim 2, wherein the return course of the safety valve is slowed down by an element integral with a valve body of the safety valve.

4. The device for maintaining the position of the shaft of the hydraulic cylinder according to claim 3, wherein a laminar flow of the hydraulic fluid is used, during operation of said device, to slow the safety valve.

5. The device for maintaining the position of the shaft of the hydraulic cylinder according to claim 1, wherein the safety valve is slowed by a viscous contact with a portion of the shaft of the safety valve.

6. The device for maintaining the position of the shaft of the hydraulic cylinder according to claim 1, wherein the means for opening of both the safety valve and the primary anti-return valve includes a connection which transmits an open force to the primary anti-return valve via the safety valve.

7. The device for maintaining the position of the shaft of the hydraulic cylinder according to claim 1, wherein the means for opening of both the safety valve and the primary anti-return valve includes play which physically dissociates the anti-return valve and the safety valve from one another and facilitates opening of the safety valve prior to the primary anti-return valve.

8. The device for maintaining the position of the shaft of the hydraulic cylinder according to claim 1, wherein the means for opening of both the safety valve and the primary anti-return valve includes a shaft integral with a body of the safety valve, and an extremity of the shaft integral with a body of the safety valve is spaced from a body of the primary anti-return valve to form play therebetween when both the anti-return valve and the safety valve are in a closed position.

9. The device for maintaining the position of the shaft of the hydraulic cylinder according to claim 6, wherein the means for opening of both the safety valve and the primary anti-return valve, via the safety valve, also includes the delay means for delaying the closing of the safety valve until after the primary anti-return valve is closed.

10. The device for maintaining the position of the shaft of the hydraulic cylinder according to claim 1, wherein pressure is used to open the safety valve.

11. The device for maintaining the position of the shaft of the hydraulic cylinder according to claim 10, wherein the pressure used to open the safety valve is hydraulic pressure which activates the other of said one of the chambers.

12. The device for maintaining the position of the shaft of the hydraulic cylinder according to claim 10, wherein the pressure used to open the safety valve is hydraulic pressure which activates a return of the cylinder shaft.

13. The device for maintaining the position of the shaft of the hydraulic cylinder according to claim 9, wherein the means for opening of both the safety valve and the primary anti-return valve and delay means comprises a composite mechanical connection formed of a series of elements which comprises a piston-button subjected to controlling pressure, a counterweight connection which is displaceable along a guide groove via contact with the piston-button, an end extremity of a shaft constitutes an extension of the safety valve body and forms an end piston, said end piston sliding with play within the guide groove of the counterweight, and the counterweight and the end piston are separated in the guide groove by a space which, together with a lateral wall of the guide groove, forms a reservoir-chamber for hydraulic fluid, and the piston-button, button, moving toward the counterweight, moves inside a chamber that is open to the atmosphere and is subject to pressure from the hydraulic fluid supplying the cylinder chamber other than said one of the chambers supplied through the sluice.

14. The device for maintaining the position of the shaft of the hydraulic cylinder according to claim 1, wherein the safety valve is a sealed valve.

15. The device for maintaining the position of the shaft of the hydraulic cylinder according to claim 1, wherein a chamber located beneath the piston-button is a buffer chamber filled with hydraulic fluid and insulated from atmosphere, and the chamber located beneath the piston-button is connected to a hydraulic fluid inlet by a shunt.

16. The device for maintaining the position of the shaft of the hydraulic cylinder according to claim 3, wherein the spring bias of at least one of the primary anti-return valve and the safety valve has two different rigidity features to provide a shock absorbing effect.

17. The device for maintaining the position of the shaft of the hydraulic cylinder according to claim 3, wherein variations in at least one of a shape and a dimension of the hydraulic components of the device provides shock absorption.

18. The device for maintaining the position of the shaft of the hydraulic cylinder according to claim 3, wherein shock absorption results from a combined effect of hydraulic shock absorption, variations in a rigidity of the spring bias of the anti-return valve and the safety valve, and variations in at least one of a shape and a dimension of the hydraulic components of the device.

19. The device for maintaining the position of the shaft of the hydraulic cylinder according to claim 1, wherein the hydraulic cylinder is a single-effect cylinder.

20. The device for maintaining the position of the shaft of the hydraulic cylinder according to claim 1, wherein the safety valve is actuated by independent means to control operation thereof.

21. The device for maintaining the position of the shaft of the hydraulic cylinder according to claim 1, wherein a pressure member is coupled to the sluice to signal when pressure of the sluice exceeds a reference pressure.

* * * * *